United States Patent
Ricci et al.

(10) Patent No.: US 7,117,657 B2
(45) Date of Patent: Oct. 10, 2006

(54) DELIVERY POINT PACKAGER TAKEAWAY SYSTEM AND METHOD

(75) Inventors: Robert R. Ricci, Downingtown, PA (US); J. Edward Roth, Lansdale, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 79 days.

(21) Appl. No.: 10/624,650

(22) Filed: Jul. 23, 2003

(65) Prior Publication Data

US 2004/0200189 A1  Oct. 14, 2004

Related U.S. Application Data

(63) Continuation-in-part of application No. 10/411,198, filed on Apr. 11, 2003.

(51) Int. Cl.
*B65B 35/30* (2006.01)

(52) U.S. Cl. .............................. 53/542; 53/174; 53/218
(58) Field of Classification Search ................. 53/443, 53/449, 64, 534, 542, 174, 250, 461, 463, 53/464, 466, 218, 209, 543
See application file for complete search history.

(56) References Cited

U.S. PATENT DOCUMENTS

| | | | | |
|---|---|---|---|---|
| 3,000,151 | A | * | 9/1961 | Winkler et al. ............... 53/399 |
| 3,795,163 | A | * | 3/1974 | Armstrong et al. ............ 83/30 |
| 3,815,321 | A | * | 6/1974 | Hartman ...................... 53/542 |
| 3,848,014 | A | | 11/1974 | Uchiyama et al. |
| 3,948,387 | A | | 4/1976 | Haertle |
| 3,973,372 | A | | 8/1976 | Omori |
| 4,019,947 | A | * | 4/1977 | Stock et al. ................. 493/202 |
| 4,237,677 | A | * | 12/1980 | Klapp .......................... 53/534 |
| 4,241,559 | A | * | 12/1980 | Klapp .......................... 53/534 |
| 4,244,672 | A | * | 1/1981 | Lund ........................... 198/350 |
| 4,353,196 | A | * | 10/1982 | Beer et al. .................... 53/552 |
| 4,570,418 | A | * | 2/1986 | Gino ............................ 53/435 |
| 4,617,784 | A | * | 10/1986 | Golicz et al. ................. 53/540 |
| 4,676,050 | A | * | 6/1987 | Odenthal ...................... 53/447 |
| 4,676,051 | A | | 6/1987 | Hoskinson et al. |
| 4,683,708 | A | * | 8/1987 | Linder .......................... 53/540 |
| 4,903,459 | A | | 2/1990 | Okinaka |
| 4,991,376 | A | | 2/1991 | Backman |
| 4,999,977 | A | | 3/1991 | Briscoe et al. |
| 5,027,578 | A | | 7/1991 | Netterer et al. |
| 5,113,639 | A | * | 5/1992 | Bryson ......................... 53/553 |
| 5,119,954 | A | * | 6/1992 | Svyatsky et al. ........... 209/584 |

(Continued)

FOREIGN PATENT DOCUMENTS

WO    WO 02/058855 A1    8/2002

*Primary Examiner*—Louis Huynh
(74) *Attorney, Agent, or Firm*—Greenblum & Bernstein, P.L.C.; Leland Schultz

(57) ABSTRACT

An apparatus is provided for packaging and taking away packaged sequenced product such as mail pieces. The apparatus includes a packaging device having an output end, and adapted to package sequenced products. A clamping device is adjacent to the output end of the packaging device. A conveying system is downstream from the clamping device. The conveying system incrementally moves a drop off tray. The clamping device holds one of a plurality of packaged sequenced products such that the drop off tray is in a position to stack multiple packaged sequenced products of the plurality of packaged sequenced products into the drop off tray. In one embodiment, this allows the packages not to hit the drop off tray during the stacking process. A method of packaging is also provided.

26 Claims, 6 Drawing Sheets

U.S. PATENT DOCUMENTS

| | | | | |
|---|---|---|---|---|
| 5,135,352 | A | 8/1992 | Scata et al. | |
| 5,190,282 | A * | 3/1993 | Rabindran et al. | 271/272 |
| 5,209,043 | A | 5/1993 | Kupcikevicius | |
| 5,386,678 | A | 2/1995 | Kujubu | |
| 5,588,285 | A * | 12/1996 | Odenthal | 53/534 |
| 5,615,537 | A | 4/1997 | Vollenweider | |
| 5,664,407 | A * | 9/1997 | Cooper et al. | 53/534 |
| 5,718,098 | A | 2/1998 | Grosskopf et al. | |
| 5,822,956 | A | 10/1998 | Liechti et al. | |
| 5,855,105 | A * | 1/1999 | Ferris | 53/534 |
| 5,934,048 | A | 8/1999 | Bouressa | |
| 6,189,294 | B1 * | 2/2001 | Baur | 53/534 |
| 6,219,994 | B1 * | 4/2001 | Taniguchi | 53/147 |
| 6,241,099 | B1 | 6/2001 | Hendrickson et al. | |
| 6,303,889 | B1 * | 10/2001 | Hayduchok et al. | 209/584 |
| 6,308,493 | B1 | 10/2001 | Mack et al. | |
| 6,415,582 | B1 | 7/2002 | Graushar et al. | |
| 6,443,311 | B1 | 9/2002 | Hendrickson et al. | |
| 6,501,041 | B1 * | 12/2002 | Burns et al. | 209/584 |
| 6,536,191 | B1 * | 3/2003 | Ruggiero | 53/475 |
| 6,539,689 | B1 | 4/2003 | Yoshimoto | |
| 6,659,442 | B1 * | 12/2003 | Steinborn et al. | 53/475 |
| 6,931,816 | B1 * | 8/2005 | Roth | 53/228 |
| 2001/0009234 | A1 | 7/2001 | Hendrickson et al. | |
| 2001/0011796 | A1 | 8/2001 | Hendrickson et al. | |
| 2001/0014270 | A1 | 8/2001 | Hendrickson et al. | |
| 2002/0023861 | A1 | 2/2002 | Mileaf et al. | |
| 2002/0074268 | A1 | 6/2002 | Hendrickson et al. | |

* cited by examiner

DELIVERY POINT PACKAGER TAKEAWAY SYSTEM AND METHOD

CROSS REFERENCE TO RELATED APPLICATIONS

This application is a continuation-in part of co-pending U.S. application Ser. No. 10/411,198, filed on Apr. 11, 2003, all of which is incorporated by reference in its entirety.

BACKGROUND OF THE INVENTION

1. Field of the Invention

The invention generally relates to a delivery point packager system and method and, more particularly, to a system and method for packaging and transporting packages from a sorting machine in delivery point sequence.

2. Background Description

The sorting of mail and other types of objects or products is a very complex, time consuming task. In general, the sorting of mail objects such as letters and flats are processed though many stages, including back end processes. In the back end processes, the mail objects are sorted and then sequenced into a delivery point sequence for future delivery to specific delivery point addresses. The sorting and sequencing processes can either be manual or automated, depending on the mail sorting facility, the type of mail object to be sorted such as packages, flats, letters and the like. A host of other factors may also contribute to the automation of mail sorting and sequencing, from budgetary concerns to modernization initiatives to access to appropriate technologies to a host of other factors.

In general, most modern postal and other types of mail handling facilities have taken major steps toward automation by the implementation of a number of technologies. These technologies include, amongst others, letter sorters, parcel sorters, advanced tray conveyors, flat sorters and the like. As a result of these developments, postal facilities and other handling facilities have become quite automated over the years, considerably reducing overhead costs.

But, the largest individual cost of the mail handling system, i.e., processing, transportation and delivery, is the delivery portion of the process. This is the process of preparing the mail objects such as letters and flats into a delivery point sequence and then performing the actual delivery to each delivery address. The automation of sequencing mail objects is known in many forms. By way of example, it is known to sequence letters using a mail sorter based on, for example, a two pass sorting scheme. Of course, other known systems can equally be used to sort and sequence mail objects, a host of them readily available and known to those of ordinary skill in the art.

Now, at the end of the sequencing process, the letters or other objects are merged and placed into a tub or container in the sequence of delivery. But, the letters and other objects are merely placed in a tub or container in sequence without any physical constraints between each of the delivery point addresses. Thus, at the time of delivery the postal carrier must physically separate the mail objects from one delivery point address to the next delivery point address. This includes reading and, in instances, correlating different mail pieces for the same delivery point address. Such a task is very time consuming, and is a task prone to errors potentially resulting in the incorrect delivery of mail.

It is also known that in mixed mail scenarios, i.e., flats, letters, married mail, etc., each different type of object may be placed in a separate tub or container. In this case, the postal carrier must "sift" through each of the tubs or containers for each delivery point address. Although, each of the different types of mail pieces are in a delivery point sequence, there still remains no physical constraint between each of the delivery point addresses. Thus, the carrier must still filter through each of the tubs or containers for each address to ensure that the mail objects are being properly delivered. This, of course, is a very time consuming and error prone, too.

The invention is directed to overcoming one or more of the problems as set forth above.

SUMMARY OF THE INVENTION

In a first aspect of the invention, an apparatus is provided for packaging and taking away packaged sequenced product such as mail pieces. The apparatus includes a packaging device having an output end, and adapted to package sequenced products. A clamping device is adjacent to the output end of the packaging device. A conveying system is downstream from the clamping device. The conveying system incrementally moves a drop off tray. The clamping device holds one of a plurality of packaged sequenced products such that the drop off tray is in a position to stack multiple packaged sequenced products of the plurality of packaged sequenced products into the drop off tray. In one embodiment, this allows the packages not to hit the drop off tray during the stacking process.

In another aspect of the invention, an apparatus for packaging and stacking product includes a mechanism for sequencing product into a delivery point sequence and a mechanism for packaging individual packages of the product for each delivery point sequence. The apparatus further includes a mechanism for dropping the individual packaged product into a vertical stacked position in a takeaway container and a mechanism for incrementally moving the takeaway container a predetermined distance. In this manner, the individual packaged product can fill the takeaway container prior to a new takeaway container being positioned for filling.

In another aspect of the invention, a method of stacking packaged sequenced products is provided. The method includes aligning a drop off tray with a packaging mechanism and packaging sequenced product into individual packages of sequenced product. The individual packages of sequenced product are dropped into the drop off tray. The drop off tray is incrementally moved a predetermined distance about equal to a thickness of each of the individual packages of sequenced product. Additional individual packages of sequenced product are dropped into the drop off tray until the drop off tray is filled.

DETAILED DESCRIPTION OF EMBODIMENTS OF THE INVENTION

The invention is directed to a packaging mechanism and more particular to a mechanism which packages sequenced products such as, for example, flats and other mail items (i.e., letters), into a set of stacked merged, sequenced packages for future delivery or warehousing or the like. In aspects of the invention, the products are packaged into separate deliverable packages at a downstream point, after the sequencing of such products. The packages are then automatically stacked in a takeaway or drop off tray in delivery point sequence. In one embodiment, the packages are vertically stacked for easy access by a carrier or the like, and remain connected together in each tray to ensure that the packages remain in delivery point order. The apparatus and method significantly reduces processing times for delivering products such as flats or other products in delivery point sequence. Other applications such as warehousing and storage applications are also contemplated for use with the present invention.

Mechanism of the Invention

Figure 1:
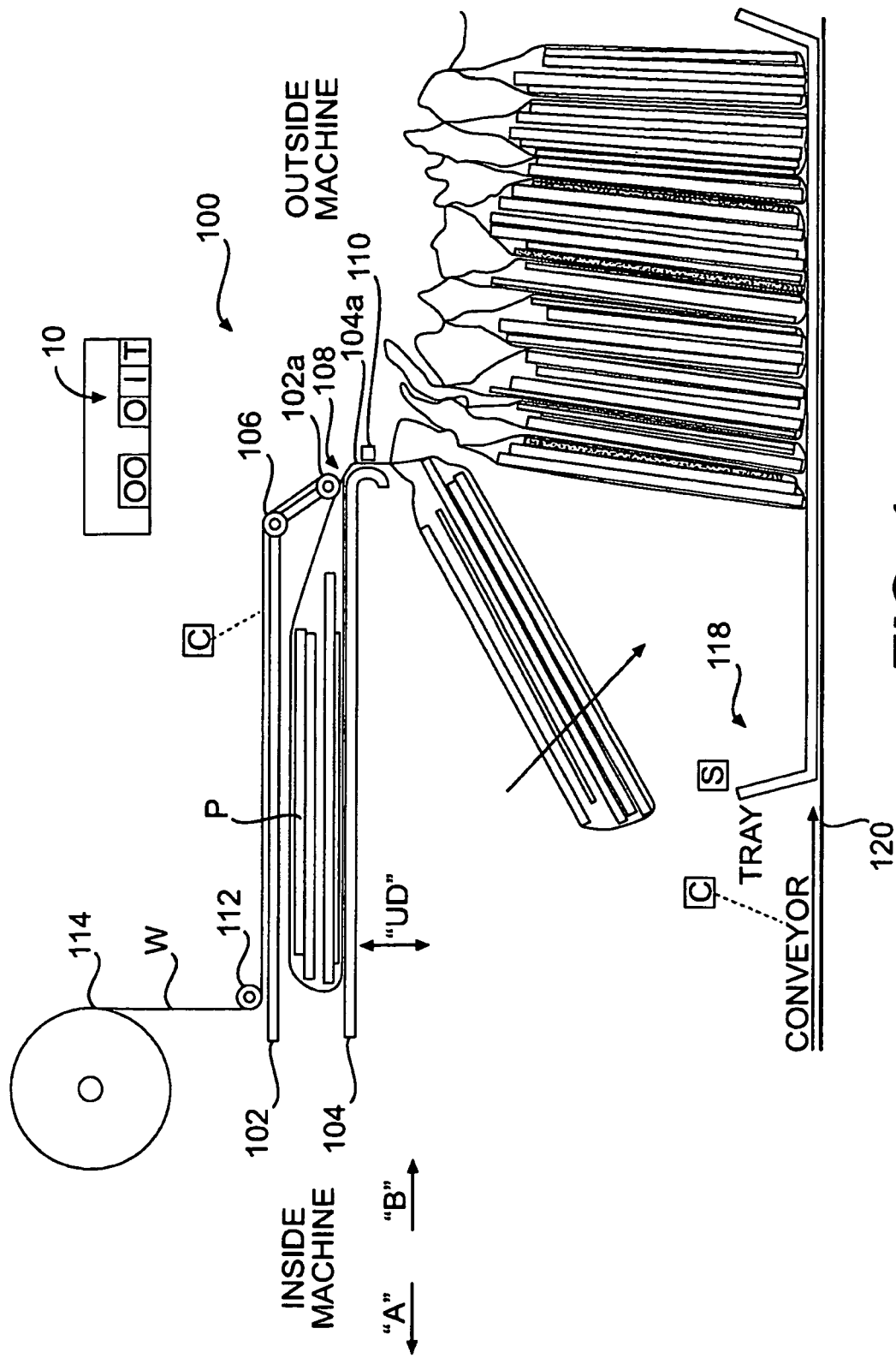
FIG. 1 shows a general schematic diagram of the system of the invention.
Figure 2:
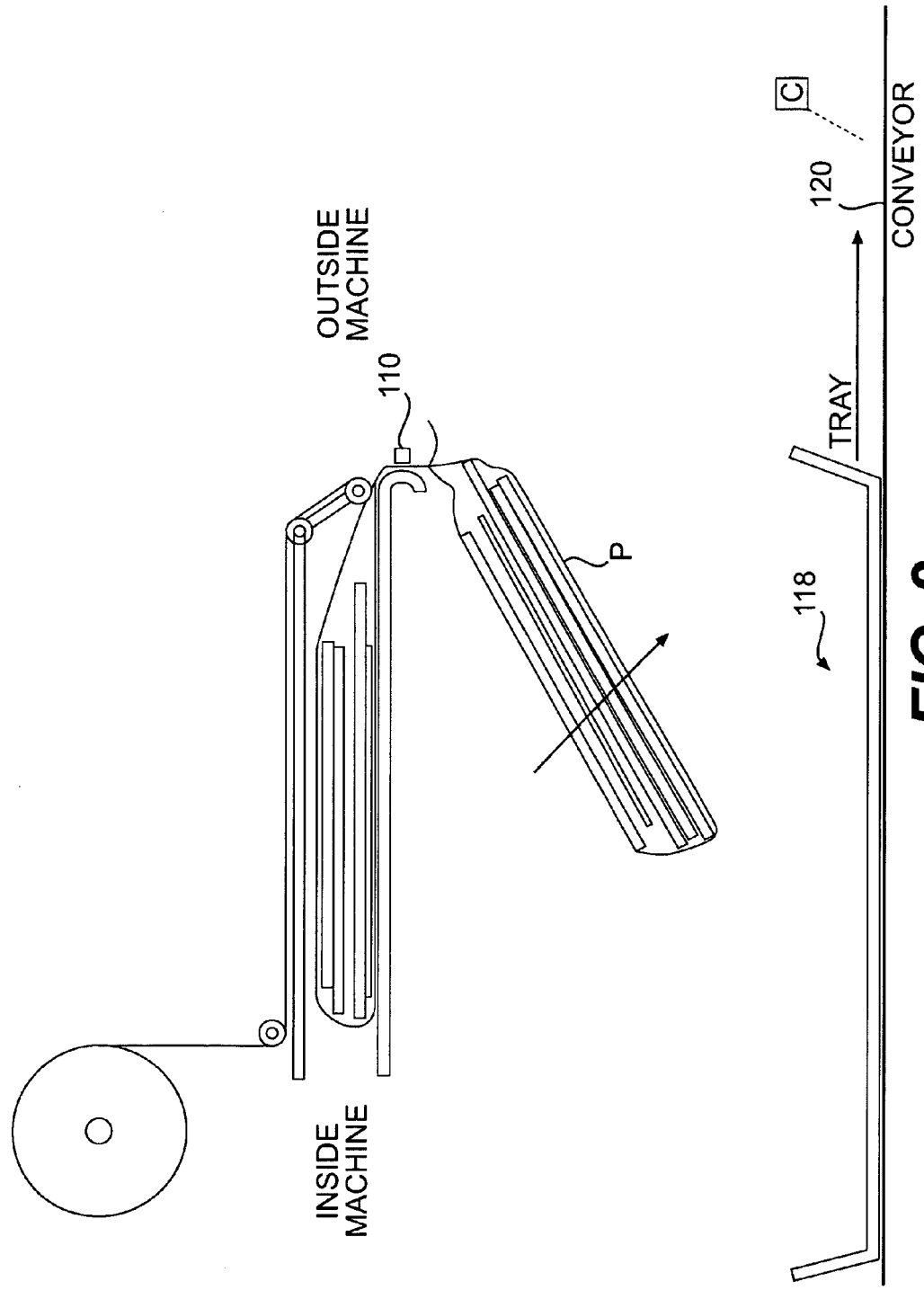
FIGS. 2–6 show several sequences of stacking packages in a tray in accordance with the invention.

Referring now to FIG. 1, a schematic diagram of the mechanism of the invention is shown. In the embodiment of FIG. 1, the mechanism is downstream from a sequencing device generally depicted as reference numeral 10. The sequencing device 10 includes an optical system "O" for reading information on mail objects and other types of products, as well as an input mechanism "I", transporting mechanism "T" and an output device "OD" feeding the product to the packaging mechanism 100. The sequencing device 10 is capable of sequencing product in a delivery point sequence as is well understood in the art, and may be any sequencing device known to those of ordinary skill in the art such as for example, a sequencing device manufactured by Lockheed Martin Systems Integration.

The packaging mechanism 100 includes a bag forming mechanism 102 (e.g., a plate-like member) and a bag bed plate or loading plate 104. The bag bed plate 104 is, in an embodiment, positioned below the bag forming mechanism 102. In an embodiment, the bag forming mechanism 102 includes a hinged portion 106 and a sealing mechanism 108 at a distal end 102a thereof The sealing mechanism 108 may be a roller or other sliding mechanism capable of sealing a bag about a package of sequenced products "P". This may include a heating device, or other sealing mechanism. The hinged portion 106 tilts between a downwardly angled position and 180°, and may be controlled by an actuator, hydraulic system or other known driving device 106a. Of course, other angles are also contemplated by the present invention.

The bag forming mechanism 102 and the bag bed plate 104 are slidable between a first position and a second position (represented by arrow "A" and "B) by using any conventional moving mechanism such as a chain drive, direct drive, linear motor, hydraulic system or the like. The first position of the bag bed plate 104 (in the direction of arrow "B" shown in FIG. 1) and the first (i.e., retracted or sort) position of the bag former mechanism 102 (in the direction of arrow "A") may be a loading position. The bag bed plate 104 is also capable of being raised and lowered during the packaging stage, either of which may also be a loading position (shown by arrow "U/D"). In an alternative embodiment, the bag former mechanism 102 may be lowered or raised instead of the bag bed plate 104. In either embodiment, the raising and lowering movement may be performed by any conventional mechanism, including by way of example a hydraulic system or a spring loaded mechanism.

Still referring to FIG. 1, the bag bed plate 104 includes, in one embodiment, a curved end 104a. In another embodiment, the end 104a may simply be straight or other configuration, none of which are limiting features to the invention. The curved end 104a, though, may facilitate the packaging and drop off of the formed package, itself. A clamping, cutting and serrate mechanism 110 is also provided. Additionally, a roller or bar-type structure 112 is positioned near a top surface of the bag forming mechanism 102 at a stage of operation. The structure 112 directs wrapping "W" from a wrapping supply roll 114 to the packaging mechanism 100. A tray or container 118 is used to hold the sequenced packaged product "P". The container 118 is located on and movable by a conveyer 120 downstream from an output end of the packaging mechanism 100. The components of the invention are controlled by controller "C", as discussed in more detail below.

Method of Use in Accordance with an Aspect of the Invention

FIGS. 2–6 show several stages of stacking the packaged objects using the packaging mechanism 100 of the invention. The packaging mechanism 100 may be positioned on a mail or product sequencing machine at a point where the mail object is normally output in a delivery point sequence into a container for transport to a delivery unit. The system receives the mail objects or other types of product such as a package, flat, letter and the like (generally referred to hereinafter as "product") for each delivery point, forms a package or bag about the products and then loads the packaged sequenced product into the container 118. In one aspect of the invention, the packages are loaded or stacked vertically into the container or tray.

Once the system packages the products in a sequence received from the sequencing machine 10, as discussed in detail in co-pending application Ser. No. 10/411,198, the packaged, sequenced product is then vertically placed into the tray. More specifically, referring to FIG. 2, the tray is positioned in a first position "P", basically aligned with the clamping, cutting and serrate mechanism 110. In the stages of FIGS. 2–5, the clamping, cutting and serrate mechanism 110 is used for holding and serrating of the wrap "W". In these stages, also, the packaged product "P" is swung into the container in a vertical position.

Figure 3:
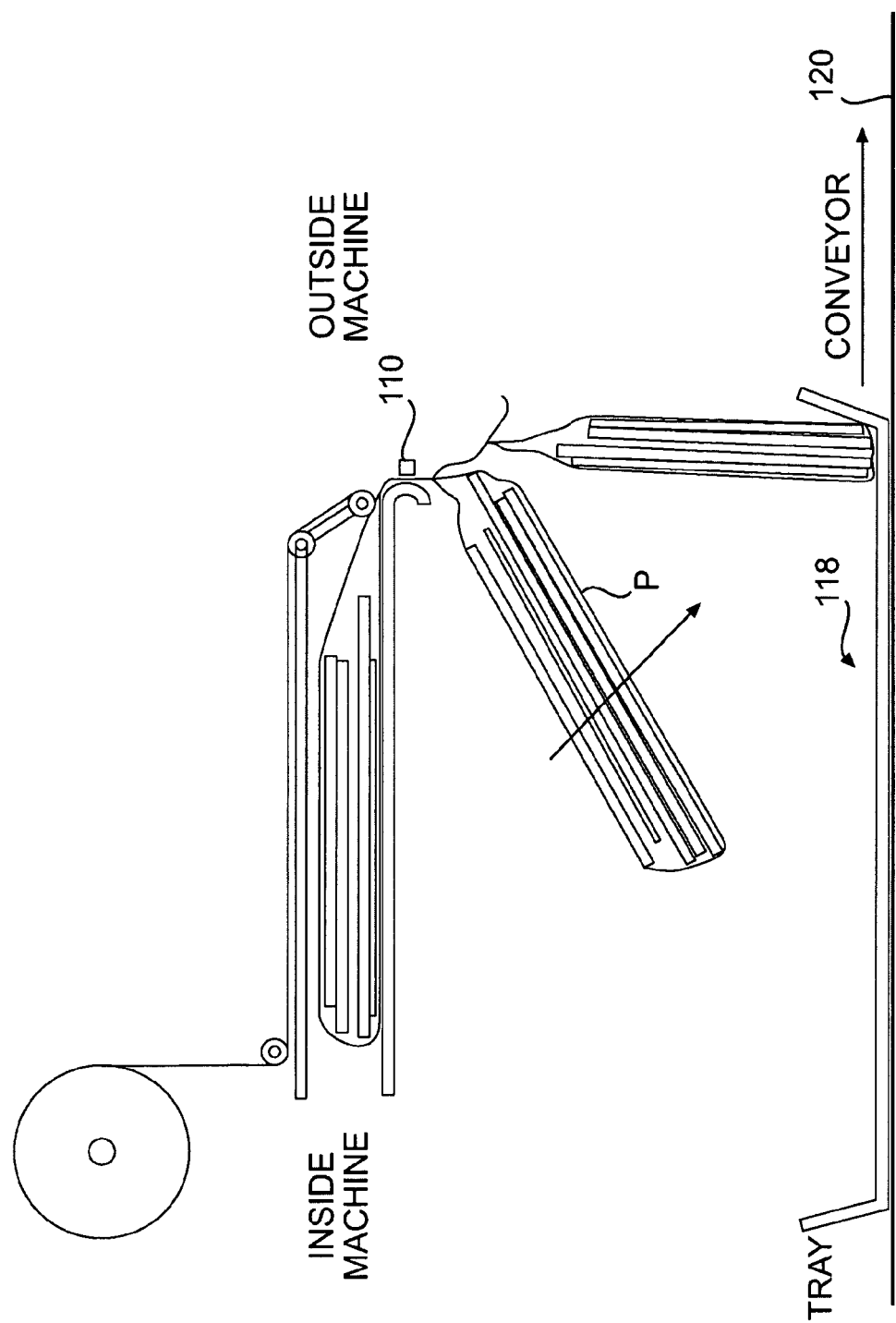

FIG. 3 shows the first packaged product in a vertical position. As the next sequenced product is packaged, the tray 118 is moved incrementally on the conveyer 120 to accommodate the next packaged product. At this stage, the clamping and holding mechanism 110 holds the packaged product at a height above the tray in order to avoid the packaged product from striking a rear wall of the tray. When the tray is properly positioned, the clamping and serrate mechanism 110 will release the next packaged product into the tray. The packaged product is, in one embodiment, stacked in the vertical position.

Figure 4:
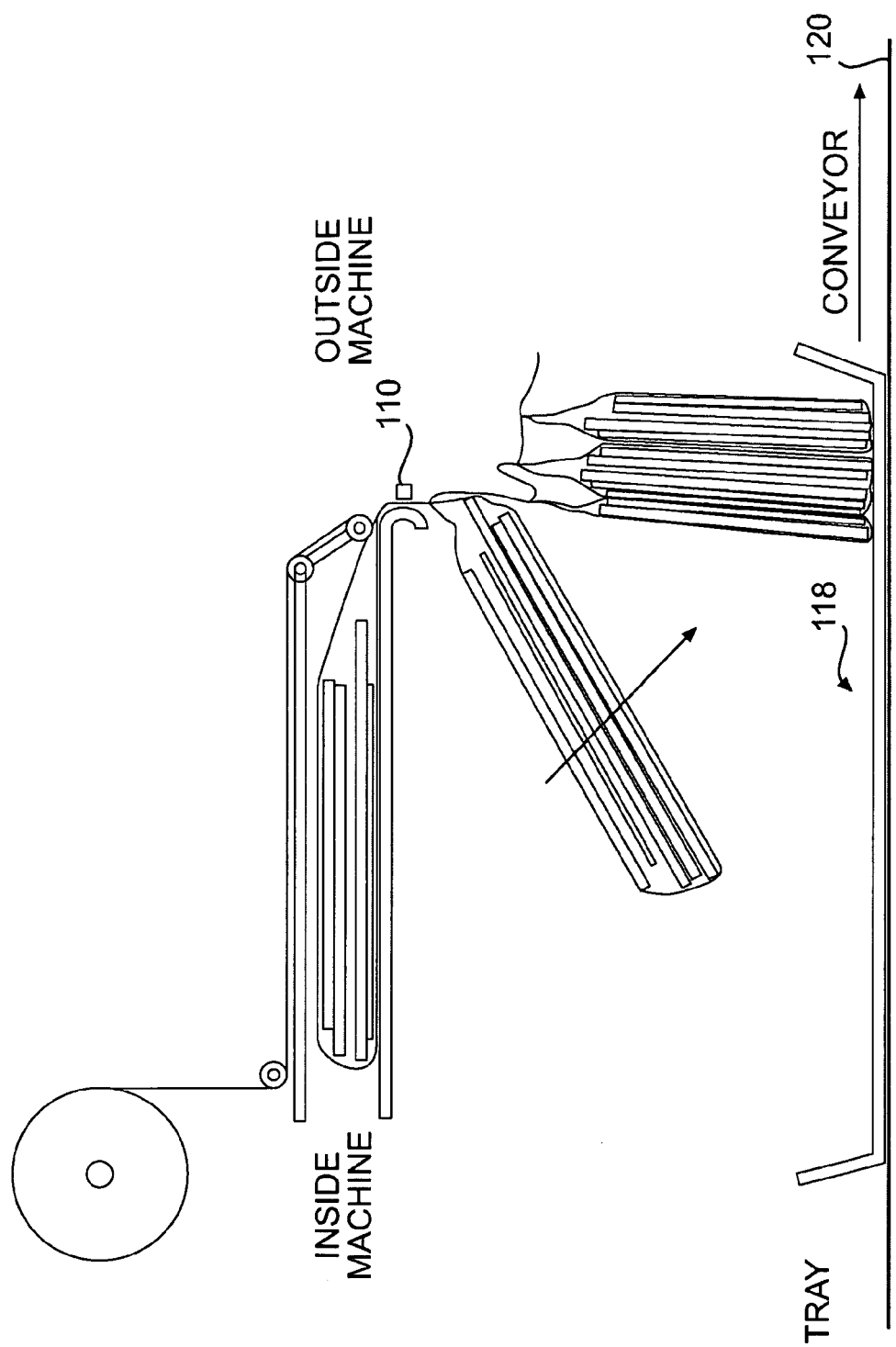
Figure 5:
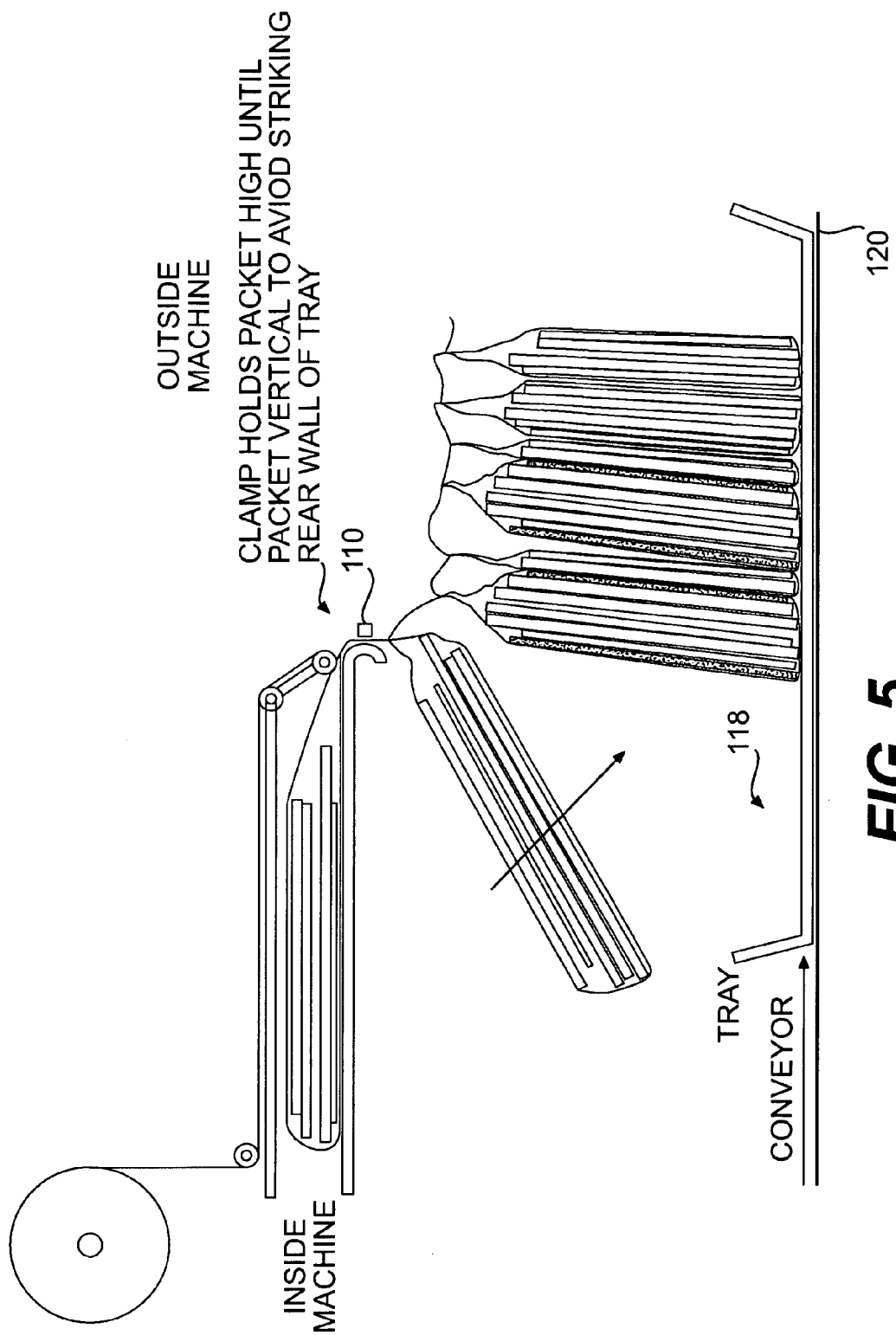
Figure 6:
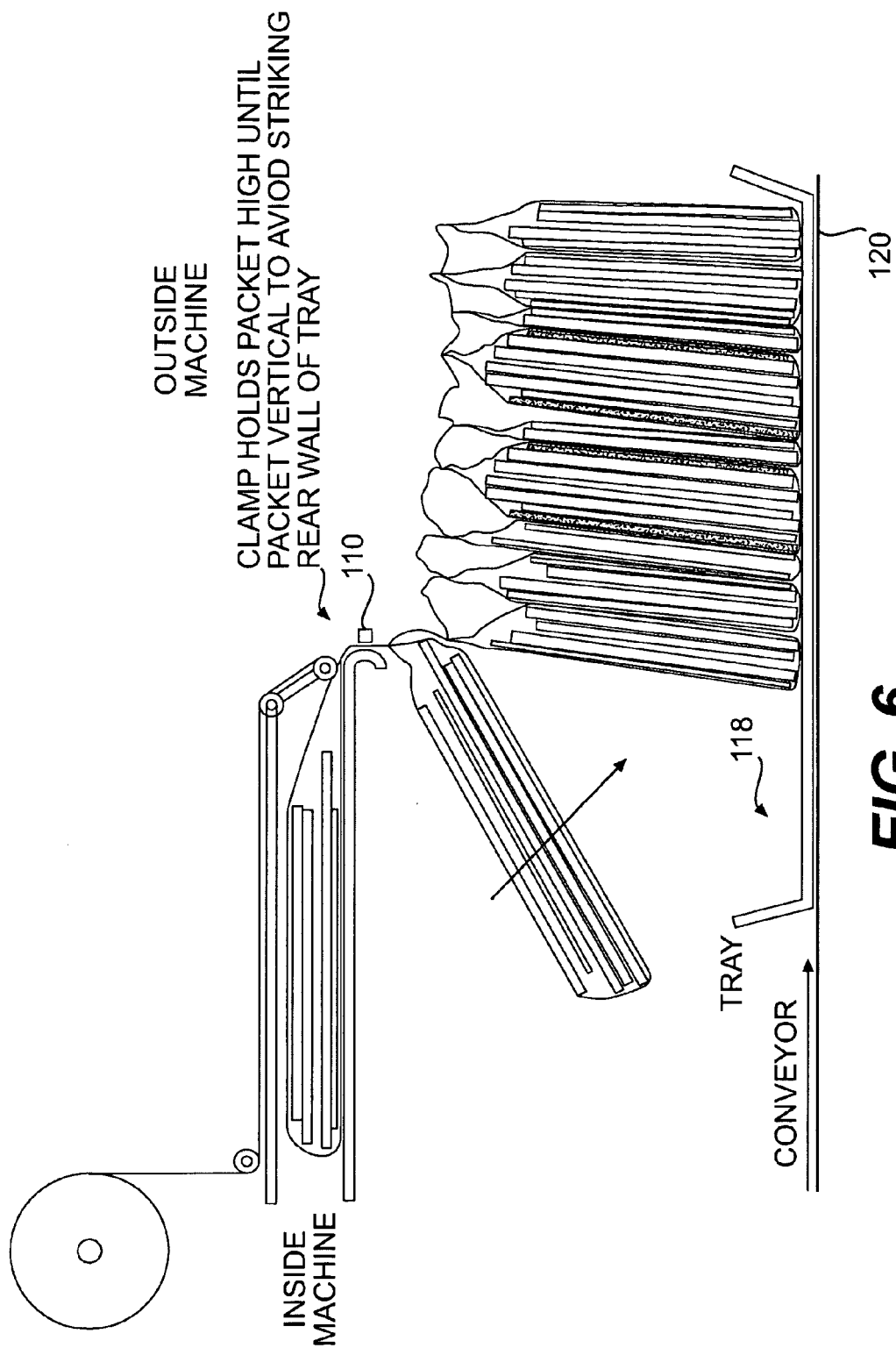

As seen in FIGS. 4–6, this same process repeats itself until the container is full of sequenced packaged product in delivery point order, all in a vertical, stacked position. FIGS. 4–6 further show that the wrap remains interconnected between packages during the stacking process. This ensures that the packaged products remain in a delivery order, and also permits easy tear off by a carrier when at the corresponding delivery point. The latter being possible due to a serration performed on the wrap "W" at the interconnection points by the clamping and serrate mechanism 110 prior to dropping each packaged product into the tray. When the tray is full, the wrap is cut by the mechanism 110 so that a next tray, if needed, can be positioned for filling in accordance with the invention.

The controller "C" controls the incremental movement of the tray, as well as the holding, serrating and cutting of the wrap "W" at various stages. In one embodiment, the controller "C" controls the conveyer to move a predetermined distance, approximately one package size, after the mechanism 100 releases a package into the tray. This may be preprogrammed or performed on the "fly", depending on a measured thickness of the package by a sensor such as a photo diode or the like. The sensor, for example, may measure a distance between the plates 102 and 104 when a packaged product is therebetween to determine the thickness of each package, as can be readily implemented by those of ordinary skill in the art from an understanding of the above description.

It should also be readily ascertainable by those of ordinary skill in the art by reading the description herein that the controller may also be able to determine when the tray is full by at least one of two methods. First, a sensor "S" may be used to determine when the tray is full. This sensor "S" may be a photo diode which becomes blocked, for example, when the tray becomes full. At this time, the controller may then control the system to place an empty tray into a loading position, which is already on the conveyor. Second, the system can determine when the tray is full by knowing the size of the tray and the thickness of each package prior to being stacked into the tray. Other methods are also contemplated by the present invention.

While the invention has been described in terms of embodiments, those skilled in the art will recognize that the invention can be practiced with modification within the spirit and scope of the appended claims.

We claim the following:

1. An apparatus comprising:
   a packaging device comprising a wrapping mechanism and having an output end, the packaging device packaging sequenced products with wrap;
   a clamping device adjacent to the output end of the packaging device; and
   a conveying system downstream from the clamping device, the conveying system moving a drop off tray incrementally,
   wherein the clamping device holds one of a plurality of packaged sequenced products against a portion of the wrapping mechanism until the drop off tray is in a position to stack multiple packaged sequenced products of the plurality of packaged sequenced products and releases said one of the plurality of packaged sequenced product into the drop off tray as the drop off tray is moved, incrementally.

2. The apparatus in accordance with claim 1, wherein the sequenced products are mail pieces.

3. The apparatus in accordance with claim 1, wherein the clamping device holds each of the plurality of packaged sequenced products until the conveying system conveys the drop off tray to a predetermined area.

4. The apparatus in accordance with claim 3, further comprising a serrating device which serrates wrap attached between adjacent packaged sequenced products in the drop off tray prior to being stacked in the drop off tray.

5. The apparatus in accordance with claim 1, further comprising a serrating device which serrates wrap between adjacent packaged sequenced product prior to being stacked in the drop off tray such that each of the adjacent packaged sequenced products in the drop off tray remain connected to one another via the wrap.

6. The apparatus in accordance with claim 5, further comprising a cutting device for cutting the wrap downstream of a last package of the sequenced products of the plurality of packaged sequenced products to be stacked in the drop off tray.

7. The apparatus in accordance with claim 1, further comprising a controller controlling the incremental movement of the conveying system based on a parameter of the packaged sequenced product.

8. The apparatus in accordance with claim 1, wherein the clamping device holds the one of a plurality of packaged sequenced products such that each of the one of the plurality of packaged sequenced products are vertically stacked into the drop off tray.

9. The apparatus in accordance with claim 1, further comprising
   a serrating device which serrates wrap attached between adjacent packaged sequenced products in the drop off tray prior to being stacked in the drop off tray such that the adjacent packaged sequenced product remain connected to one another via the wrap within the drop off tray; and
   a cutting device for cutting the wrap downstream of a last package of sequenced products of the plurality of packaged sequenced products to be stacked in the drop off tray,
   wherein the clamping device holds each of the plurality of packaged sequenced products at a predetermined height prior to dropping into the drop off tray such that the each of the plurality of packaged sequenced products does not hit an end of the drop off tray.

10. The apparatus in accordance with claim 9, further comprising a controller, wherein the controller controls:
    the incremental movement of the conveying system based on a parameter of the packaged sequenced products;
    the clamping device to hold the each of the plurality of packaged sequenced products at a predetermined height prior to dropping into the drop off tray;
    the serrating device to serrate an interconnection between adjacent packaged sequenced products prior to dropping into the drop off tray; and
    the cutting device to cut the wrap at end portion of the last of the packaged sequenced products dropped into the drop off tray.

11. The apparatus in accordance with claim 1, wherein the packaging device forms bags or packages from the wrap, seals each of the bags or packages, and is arranged downstream from a roll of the wrap.

12. The apparatus in accordance with claim 1, wherein the wrapping mechanism comprises a movable package forming mechanism and a movable loading device.

13. The apparatus in accordance with claim 1, wherein the conveying system is arranged beneath the output end of the packaging device.

14. The apparatus in accordance with claim 1, wherein the apparatus is structured and arranged to automatically stack the plurality of packaged sequenced products in the drop off tray in a delivery point sequence.

15. The apparatus of claim 1, wherein the plurality of packaged sequenced products remain connected together in the drop off tray and are arranged in a delivery point sequence.

16. An apparatus for packaging and stacking product, comprising:
    means for sequencing product into a delivery point sequence;
    means for packaging sequenced product in wrap to form individual packages of the product for the delivery point sequence;

means for dropping the individual packages into a vertical stacked position in a takeaway container; and means for incrementally moving the takeaway container a predetermined distance such that the individual packages can fill the takeaway container prior to a new takeaway container being positioned for filling.

17. The apparatus in accordance with claim 16, wherein the product is mail pieces.

18. The apparatus in accordance with claim 16, wherein the means for dropping includes means for serrating wrap which wraps the product into the individual packages, the serrating means serrates the wrap at an interconnection between adjacent individual packages to ensure that the individual packages remain in a sequenced order.

19. The apparatus in accordance with claim 18, further comprising a controlling means for controlling the serrating means wherein the wrap is serrated at the interconnection between adjacent individual packages.

20. The apparatus in accordance with claim 16, wherein the dropping means is a clamping device which holds the individual packages until the takeaway tray is properly aligned with a next of the individual packages.

21. The apparatus in accordance with claim 20, wherein the means for packaging is configured to wrap the product into individual packages, and the dropping means further includes a cutting means for cutting the wrap after a last of the individual packages to be stacked into the takeaway tray.

22. The apparatus in accordance with claim 21, further comprising a controlling means for controlling the cutting means, wherein the wrap is cut after a last of the individual packages is stacked into the takeaway tray.

23. An apparatus comprising:

a wrapping mechanism that that wraps and seals wrap around sequenced products to form bags or packages of sequenced products;

at least one of a clamping device, a cutting device, and a serrating device arranged adjacent to an output end of the wrapping mechanism;

a conveying system arranged downstream from the output end, the conveying system moving a drop off tray beneath the output end; and a controller that controls the wrapping mechanism and the conveying system such that said at least one of the clamping device, the cutting device and the serrating device holds one of the bags or packages of sequenced products against a portion of the wrapping mechanism and releases the one of the bags or packages of sequenced products into the drop off tray as the drop off tray moves incrementally.

24. The apparatus of claim 23, further comprising a sequencing device that sequences the sequenced products.

25. The apparatus of claim 23, wherein the apparatus is structured and arranged to automatically stack the bags or the packages in the drop off tray in a delivery point sequence.

26. The apparatus of claim 23, wherein the bags or the packages remain connected together in the drop off tray and are arranged in a delivery point sequence.

* * * * *